(12) United States Patent  (10) Patent No.: US 7,159,354 B1
White  (45) Date of Patent: Jan. 9, 2007

(54) FISHING POLE HOLDER

(76) Inventor: Larry White, 2004 Meadowood Ct., Bakersfield, CA (US) 93309

( * ) Notice: Subject to any disclaimer, the term of this patent is extended or adjusted under 35 U.S.C. 154(b) by 0 days.

(21) Appl. No.: 11/237,121

(22) Filed: Sep. 28, 2005

(51) Int. Cl.
*A01K 97/12* (2006.01)
*A01K 97/10* (2006.01)

(52) U.S. Cl. .......................... 43/17; 43/21.2; 248/512; 248/520; 248/528

(58) Field of Classification Search ............... 43/17, 43/16, 21.2; 248/512, 519, 520, 528, 529
See application file for complete search history.

(56) References Cited

U.S. PATENT DOCUMENTS

| | | | | |
|---|---|---|---|---|
| 371,777 A | * | 10/1887 | McCabe | 248/520 |
| 440,727 A | * | 11/1890 | Sheafe | 248/520 |
| 879,052 A | * | 2/1908 | Jeranek | 43/21.2 |
| 1,330,314 A | * | 2/1920 | Gott et al. | 43/17 |
| 2,311,823 A | * | 2/1943 | Gaskill | 43/21.2 |
| 2,317,445 A | * | 4/1943 | Davidson et al. | 43/21.2 |
| 2,438,388 A | * | 3/1948 | Dolk | 43/21.2 |
| 2,567,777 A | * | 9/1951 | Massino | 43/17 |
| 2,811,801 A | * | 11/1957 | Daniel | 43/15 |
| 2,869,814 A | * | 1/1959 | Hurlimann | 248/520 |
| 2,899,155 A | * | 8/1959 | Rogers | 43/21.2 |
| 2,964,868 A | * | 12/1960 | Bennett | 43/21.2 |
| 2,973,929 A | * | 3/1961 | Zawadzki | 248/528 |
| 3,170,262 A | * | 2/1965 | Hall | 43/15 |
| 3,327,978 A | * | 6/1967 | Gates | 43/21.2 |
| 3,359,928 A | * | 12/1967 | Gamble | 248/514 |
| 3,371,443 A | * | 3/1968 | Dobson | 43/17 |
| 3,401,479 A | * | 9/1968 | Keyes | 43/16 |
| 3,546,805 A | * | 12/1970 | Schaefer | 43/17 |
| 3,586,274 A | * | 6/1971 | Hart | 248/530 |
| 3,593,949 A | * | 7/1971 | Fliege | 248/518 |
| 3,636,649 A | * | 1/1972 | Paiva | 43/21.2 |
| 3,670,443 A | * | 6/1972 | Federline | 43/17 |
| 3,701,504 A | * | 10/1972 | Woods et al. | 248/520 |
| 3,846,929 A | * | 11/1974 | McBride | 43/17 |
| 3,979,852 A | * | 9/1976 | Johnson | 43/16 |
| 4,133,131 A | * | 1/1979 | Davy | 43/21.2 |
| 4,159,816 A | * | 7/1979 | Miyamae | 43/21.2 |
| 4,461,113 A | * | 7/1984 | Erwin | 43/15 |
| 4,479,322 A | * | 10/1984 | Koppel | 43/21.2 |
| 4,523,403 A | * | 6/1985 | Ivy et al. | 43/17 |
| 4,594,805 A | * | 6/1986 | McClelland | 43/21.2 |
| 4,627,186 A | * | 12/1986 | Wang | 43/16 |
| 4,676,019 A | * | 6/1987 | Engles | 43/21.2 |
| 4,763,435 A | * | 8/1988 | Deering | 43/21.2 |
| 4,811,512 A | * | 3/1989 | Amos | 43/17 |
| 4,854,069 A | * | 8/1989 | Smith et al. | 43/21.2 |
| 4,936,039 A | * | 6/1990 | Huber et al. | 43/21.2 |
| 4,964,233 A | * | 10/1990 | Benson et al. | 43/17 |
| 5,025,584 A | * | 6/1991 | Butterwick, Sr. | 43/21.2 |
| 5,050,333 A | * | 9/1991 | Debreczeni | 43/17 |
| 5,058,308 A | * | 10/1991 | Girard | 43/17 |
| 5,063,373 A | * | 11/1991 | Lindsley | 43/17 |
| 5,063,701 A | * | 11/1991 | Ottens | 43/21.2 |
| 5,269,088 A | * | 12/1993 | Slaback et al. | 43/17 |

(Continued)

FOREIGN PATENT DOCUMENTS

DE  3710671 A1 *  3/1987

(Continued)

*Primary Examiner*—Darren W. Ark
(74) *Attorney, Agent, or Firm*—Milord A. Keshishian

(57) ABSTRACT

A fishing pole holder adapted to provide both audible and visual indication of a strike by a fish. The fishing pole holder can be adapted to accommodate a plurality of fishing poles.

13 Claims, 4 Drawing Sheets

U.S. PATENT DOCUMENTS

| | | | |
|---|---|---|---|
| 5,355,610 A * | 10/1994 | Sizemore et al. | 43/17 |
| 5,359,803 A * | 11/1994 | Shieh | 43/21.2 |
| 5,400,996 A * | 3/1995 | Drish | 248/520 |
| 5,560,137 A * | 10/1996 | Herring | 43/21.2 |
| 5,570,532 A * | 11/1996 | Shaffer et al. | 43/17 |
| 5,571,227 A * | 11/1996 | Pisarek | 43/21.2 |
| 5,613,318 A * | 3/1997 | Hislop | 43/16 |
| 5,685,107 A * | 11/1997 | Sweet | 43/21.2 |
| 5,752,340 A * | 5/1998 | Fleener | 43/21.2 |
| 5,803,519 A * | 9/1998 | Daigle | 294/159 |
| 5,873,192 A * | 2/1999 | Chiu | 43/21.2 |
| 5,987,801 A * | 11/1999 | Anderson | 43/17 |
| 6,128,848 A * | 10/2000 | Wong | 43/21.2 |
| 6,196,513 B1 * | 3/2001 | Edwards et al. | 248/528 |
| 6,341,443 B1 * | 1/2002 | Watford et al. | 43/17 |
| 6,421,948 B1 * | 7/2002 | Craig | 43/17 |
| 6,427,376 B1 * | 8/2002 | Weber | 43/21.2 |
| 6,446,379 B1 * | 9/2002 | James | 43/17 |
| 6,484,433 B1 * | 11/2002 | Greene | 43/21.2 |
| 6,568,122 B1 * | 5/2003 | Smith | 43/21.2 |
| 6,594,941 B1 * | 7/2003 | Anderson | 43/17 |
| 6,646,557 B1 * | 11/2003 | Brake | 340/573.2 |
| 6,718,682 B1 * | 4/2004 | Seitsinger et al. | 43/21.2 |
| 6,983,560 B1 * | 1/2006 | Williams | 43/21.2 |
| 2004/0118031 A1 * | 6/2004 | Nielson | 43/21.2 |
| 2005/0138856 A1 * | 6/2005 | Hansen | 43/21.2 |

FOREIGN PATENT DOCUMENTS

| | | | |
|---|---|---|---|
| FR | 2612740 A1 * | 9/1988 | |
| GB | 2047061 A * | 11/1980 | |
| GB | 2143412 A * | 2/1985 | |
| GB | 2166331 A * | 5/1986 | |
| GB | 2175782 A * | 12/1986 | |
| GB | 2232863 A * | 1/1991 | |
| GB | 2248755 A * | 4/1992 | |
| GB | 2274761 A * | 8/1994 | |

* cited by examiner

FISHING POLE HOLDER

FIELD OF THE INVENTION

The invention relates to fishing equipment and apparatus. More particularly, the invention relates to holders and devices adapted for holding fishing poles while fishing, for detecting a strike and providing a visual and audible signal of the strike.

BACKGROUND OF THE INVENTION

Fishing can require a great deal of patience, since the fisherman must often wait quite a long time for a fish to bite. Holding the fishing pole during this entire time can be tedious. Bank or shoreline fishermen are known to use crude fishing pole holders such as a bucket, however, the poles are bound to topple and possibly be dragged into the water.

In addition, many fishermen prefer to cast several lines simultaneously to increase the strike rate. However, it is difficult to hold more than one pole at a time and the invention provides an efficient system for holding more than one pole, while allowing them to be picked up quickly and easily when it is necessary to hook and reel in a fish. Further, the prior art namely holds the fishing pole at the handle portion thereof and allows the tip of the pole to be affected by wind and deceiving the fisherman into believing that there is a strike on the line.

Furthermore, fisherman often engage in other activities while waiting for a bite on the line, which distractions prevent setting of the hook when a fish has bit. The present invention provides an audible and visual indication that a bite has occurred on the line and the hook needs to be set.

U.S. Pat. No. 3,586,274 to Hart discloses a fishing pole support comprised of an elongated rod, one portion of which is formed into a continuous series of coils and the remainder of which forms a spike adapted to be inserted in the ground.

U.S. Pat. No. 3,593,949 to Fliege discloses a pole holder comprised of a resilient wire framework which is adjustably clamped to a rigid mounting means adapted to be securely anchored to the ground or other support.

U.S. Pat. No. 4,854,069 to Smith discloses a fishing pole support apparatus. The invention teaches a support apparatus that is capable of retaining a fishing pole during use in an inclined position at a selected angle and prevents dirt from coming in contact with the reel.

U.S. Pat. No. 5,359,803 to Huber, et al discloses a fishing rod holder and method of using it which relate to the use of the holder having a stake for insertion into the ground, and a fishing pole holding member, which is swingably connected to the stake and which can be swung to a storage position adjacent to the stake.

U.S. Pat. No. 5,359,803 to Shieh discloses an adjustable pole rest which includes a supporting device which consists of two telescopic rods connected by a connector for supporting a fishing rod. When not in use, the telescopic rods of the mounting device can be collapsed, and the balancing devise and the fork of the mounting device can be dismantled, therefore the storage space of the pole rest is greatly reduced.

U.S. Pat. No. 5,400,996 to Drish discloses a portable fishing pole support holder that is capable of holding a fishing pole in a range of operating positions.

U.S. Pat. No. 5,752,340 to Fleener discloses a combination rod anchor and fishing tackle box formed of a bottom and molded top in which one or more recesses are formed in the top and a portion of each recess is threaded to receive an essentially hollow tube member which has a threaded external position to mate with the threaded internal recesses of the top member and in which the hollow tube members are adapted to hold fishing rods firmly in place.

U.S. Pat. No. 6,446,379,379 to James discloses a fishing pole holding assembly which alerts a user if a fish strikes and also provides a place to store beverages.

U.S. Pat. No. 6,646,557 to Brake discloses a fishing pole holder that signals a viable strike on the lure or bait.

The prior art does not address the need for an adjustable fishing pole holder that efficiently provides a visible and audible signal that a fish has struck the bait or lure. Therefore, there remains a long standing and continuing need for an advance in the art of fishing pole holders that is simpler in both design and use, more economical and efficient in their construction and use, and provides a more secure engagement of the pole.

SUMMARY OF THE INVENTION

Accordingly, it is a general object of the present invention to overcome the disadvantages of the prior art.

Therefore, it is a primary objective of the invention to provide a fishing pole holder that is movable between a stowed position for transporting and storing the holder and an operable position in which the holder is capable of holding at least one fishing pole.

It is another objective of the invention to provide a fishing pole holder that visually and audibly notifies the user of a strike by a fish.

It is another objective of the invention to provide a fishing pole holder that is durable yet cost efficient to produce.

It is still a further objective of the invention to provide a fishing pole holder that is capable of being used for shore, boat or pier fishing.

It is yet a further object of the invention to provide a fishing pole holder that is adjustable to accommodate fishing poles of varying length.

It is yet a further object of the invention to provide a fishing pole holder that is capable of being used on uneven ground.

In keeping with the principles of the present invention, a unique fishing pole holder is disclosed that is capable of holding at least one fishing pole in a generally cast position. An alternate preferred embodiment of the fishing pole holder is also disclosed which is capable of holding two fishing poles in a cast position. However, it is to be understood that the number of holders can be expanded as needed and the invention is not limited by the number disclosed herein. The holder comprises a first region which is adapted to hold a middle portion of the shaft of a fishing pole and a second region that is adapted to hold the handle portion of a fishing pole. The first region is rotatably attached to the second region such that the holder can vary between a deployed and stowed position to allow portability thereof. A third region has an element thereon that provides a visual and audible indication of a strike on the line.

Such stated objects and advantages of the invention are only examples and should not be construed as limiting the present invention. These and other objects, features, aspects, and advantages of the invention herein will become more apparent from the following detailed description of the embodiments of the invention when taken in conjunction with the accompanying drawings and the claims that follow.

BRIEF DESCRIPTION OF THE DRAWINGS

It is to be understood that the drawings are to be used for the purposes of illustration only and not as a definition of the limits of the invention. In the drawings, wherein similar reference characters denote similar elements throughout the several views.

DETAILED DESCRIPTION OF THE INVENTION

Figure 4:
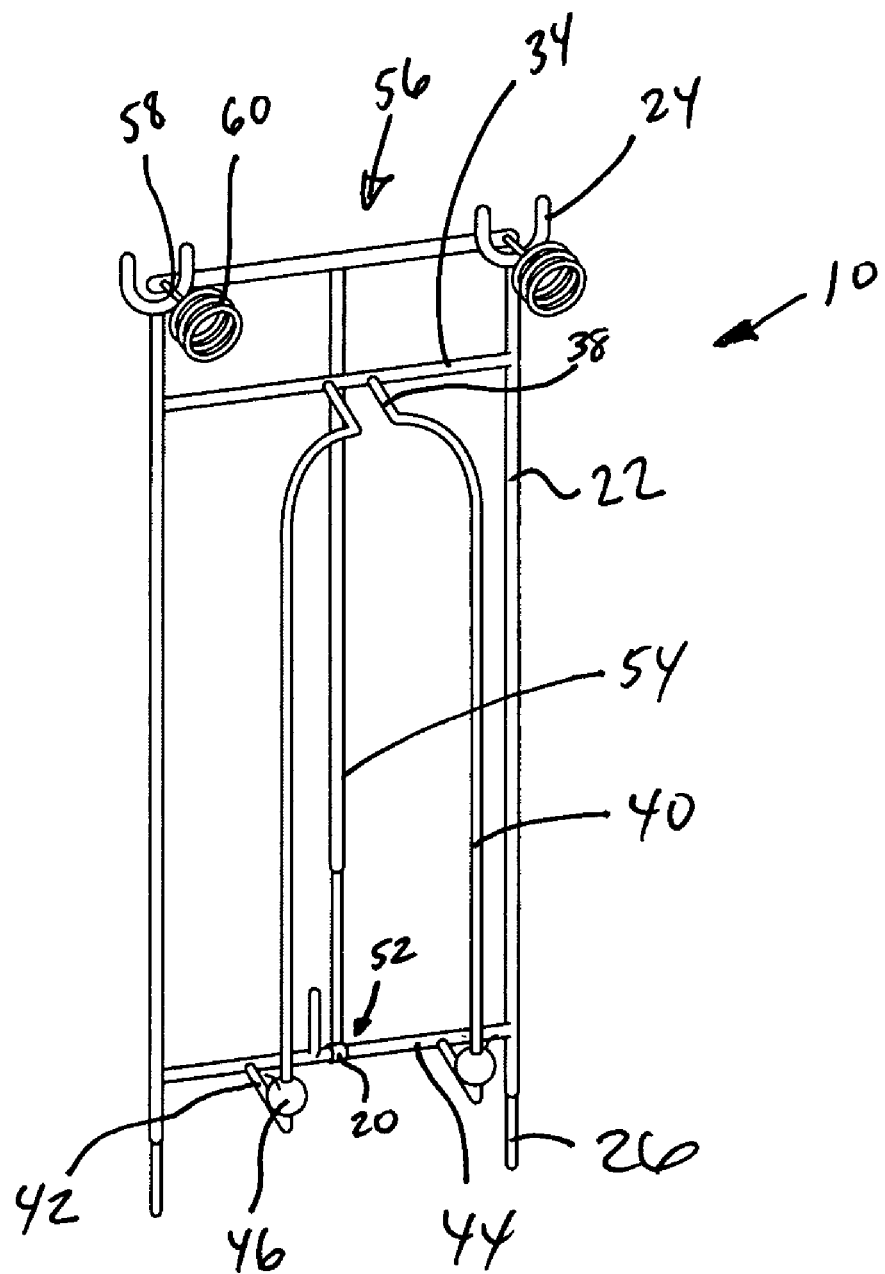
FIG. 4 is a front perspective view of a fishing pole holder of the instant invention, illustrating a dual fishing pole holder in a stowed configuration.

Referring now to the drawings, and more particularly to FIGS. 1–4, there is generally indicated at 10 a fishing pole holder of the present invention capable of holding at least one conventional fishing pole 16. The holder 10 comprises a first region generally indicated at 12, a second region generally indicated at 14 and a third region generally indicated at 18. The first region 12 is in a generally upright position when holder 12 is deployed and is rotatably attached to second region 14 at attaching region 20. Second region 14 is in a substantially horizontal position when holder 12 is deployed and is in a vertical position, as illustrated in FIG. 4, when holder 12 is in a stowed position.

Figure 1:
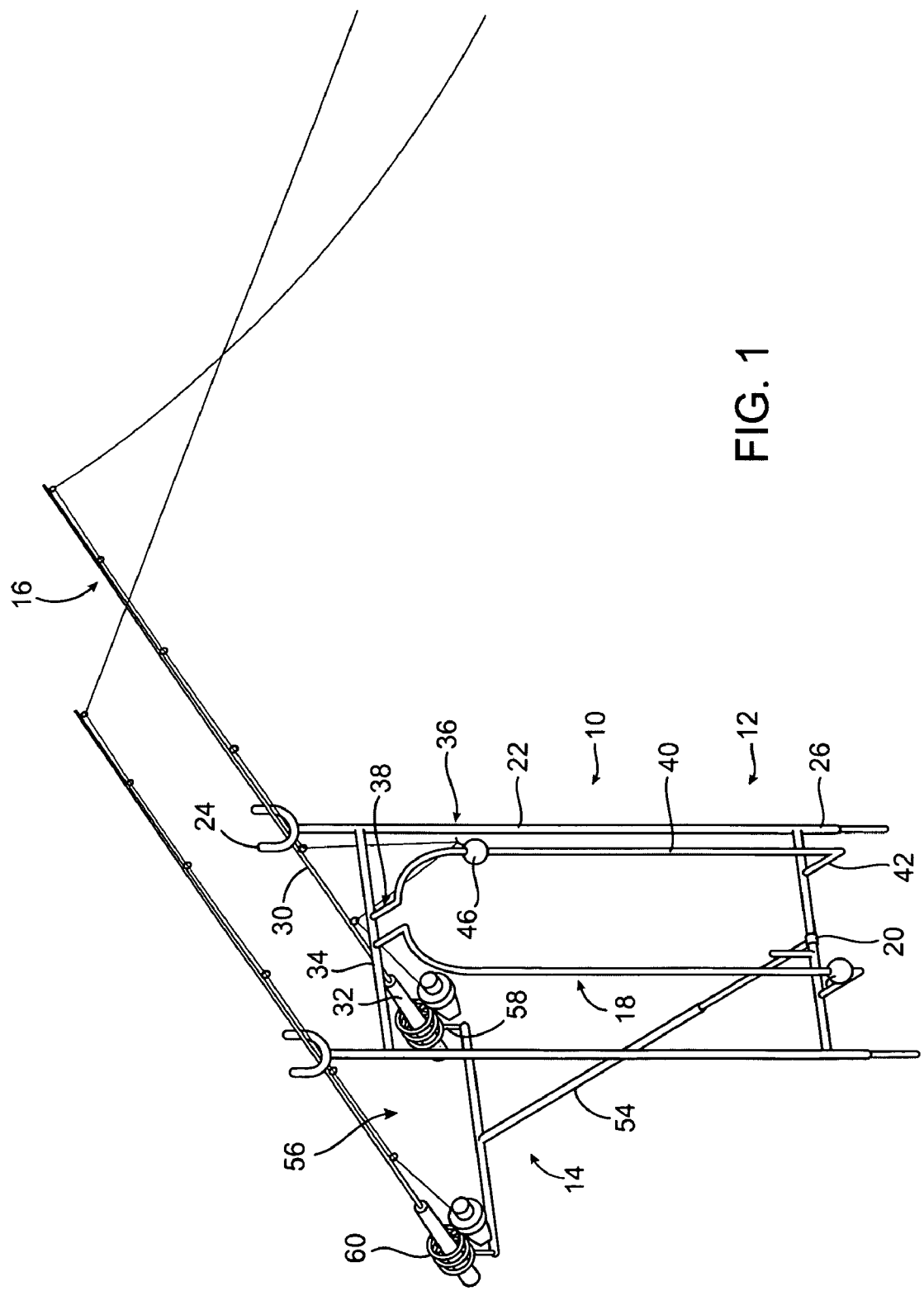
FIG. 1 is a front perspective view of a fishing pole holder of the instant invention, illustrating a dual fishing pole holder in a deployed configuration.
Figure 2:
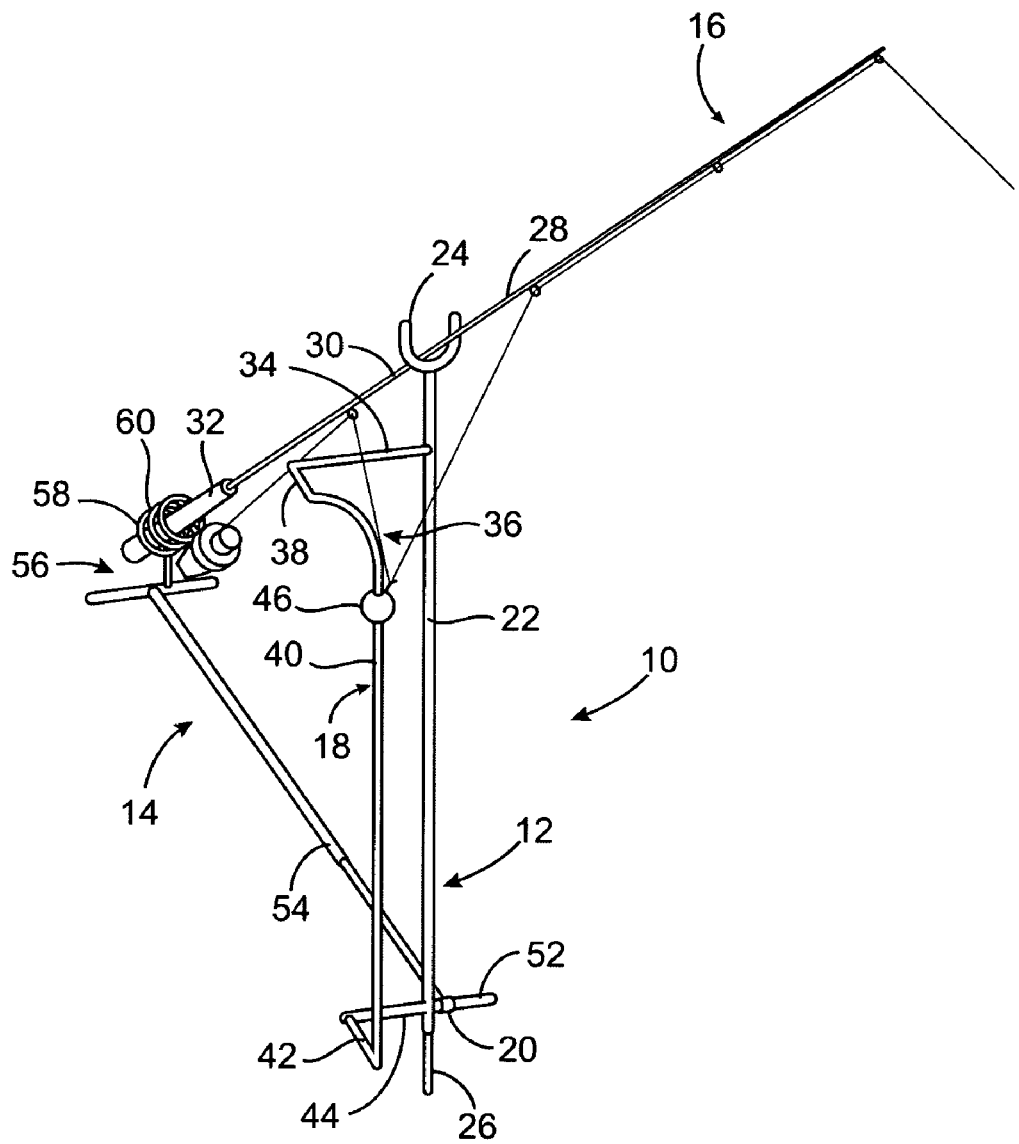
FIG. 2 is a front perspective view of a fishing pole holder of the instant invention, illustrating a single pole holder in a deployed configuration.
Figure 3:
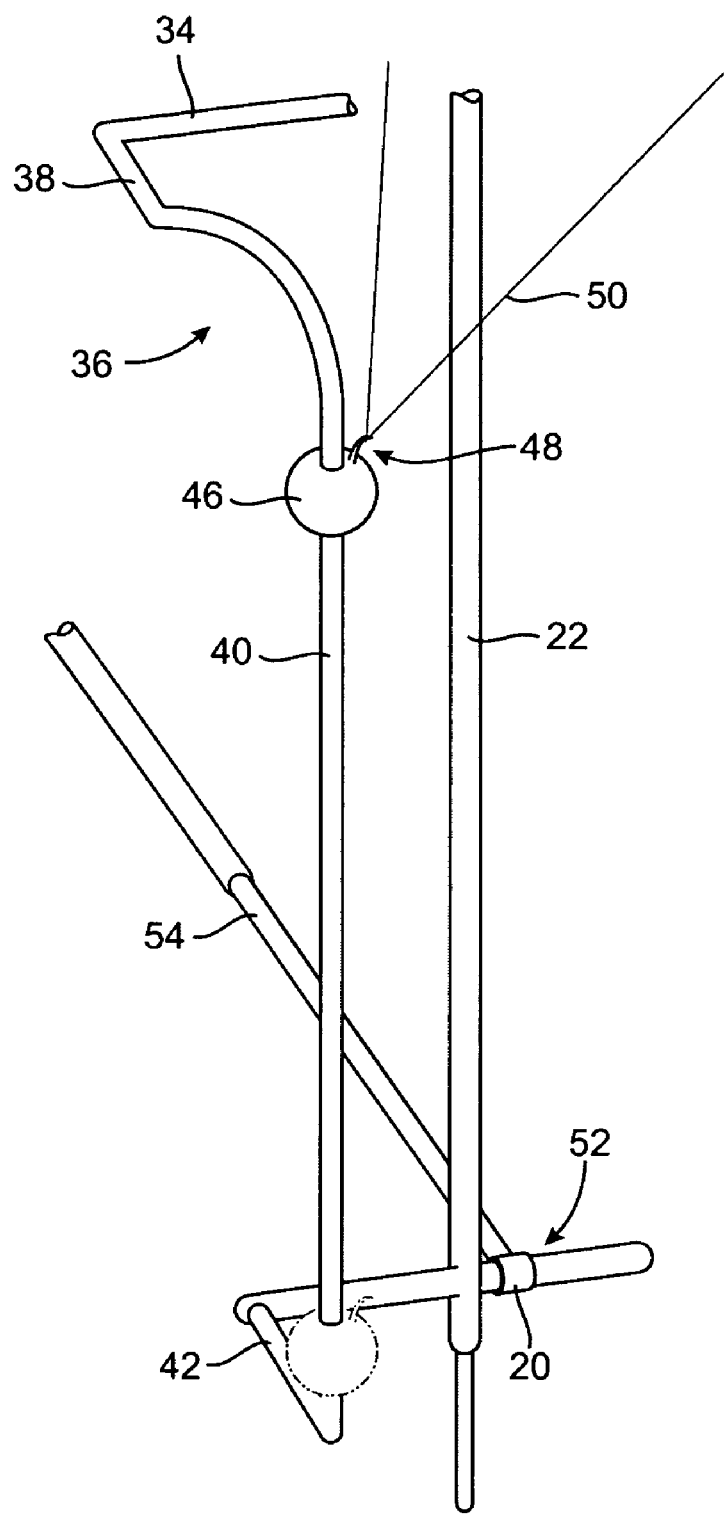
FIG. 3 is a partial perspective view of a fishing pole holder of the instant invention.

Now referring more specifically to FIG. 2, holder 10 is shown in a single configuration and it is to be understood that a mirror image of the same taken along a vertical axis produces the two holder configuration shown in FIG. 1. Accordingly, the description of the holder in FIG. 2 is equally applicable to the holder of FIG. 1. First region 12 has a leg 22 with a top portion 24 and a bottom portion 26 at opposing ends. Bottom portion 26 is adapted to engage a surface, such as dirt, sand or a dock when bottom portion 26 is exposed, or a rubber cover can be placed over the bottom portion 26 to allow use of the same on a rigid surface. Top portion 24 is constructed to receive a middle region 30 of a fishing pole 28 therein, which fishing pole 28 also has a handle region 32. In one preferred embodiment, top portion 24 is substantially U shaped.

The holder 10 and its components are preferably fabricated from a rigid material, such as, but not limited to metal or plastic. In addition, the components of holder 10 may be constructed of a tubular material to decrease the weight thereof.

Third region 18 is defined by a first connector 34 that extends from first leg 22 in a substantially perpendicular manner and attaches to alarm device 36. Alarm device 36 has a first section 38 that is substantially perpendicular to 34 and extends forward of first leg 22. A second section 40 curves downwardly from first section 38 and towards first leg 22 and becomes straight and parallel with the first leg 22. Second section 40 connects with a third section 42 at an end opposing first section 38, such that third section 42 is parallel to first section 38. Third section 42 attaches to a second connector 44 which attaches to bottom portion 26 of first leg 22.

An element 46 has an aperture there through that movably accommodates second section 40 therein. In one preferred embodiment, element 46 is spherical and made of cork material. However, it is to be understood that element 46 may be made of any rigid material. Now also referring to FIG. 3, element 46 has a protrusion 48 that is preferably curved and adapted to releasably engage and maintain a fishing line 50 when the line 50 is cast. Once a fish strikes the bait or lure, fishing line 50 becomes taught and thereby disengages from protrusion 48 which results in the fall of element 46. Element 46 falls and strikes third section 42 (phantom lines of FIG. 3) and visually and audibly notifies the user that a fish has taken the bate and it is time to set the hook. In addition, if a fish takes the bate and swims towards the holder 10, element 46 would descend and ascend on second section 40 indicating that it is time to set the hook.

In its operable position, as indicated more clearly illustrated in FIGS. 1 and 2, second region 14 rotatably engages second connector 44 at attaching region 20. Attaching region 20 has a cavity 52 in which second connecter 44 is rotatably maintained. Attaching region 20 also has an elongated member 54 that defines a base region 56 at an opposing end to said attaching region 20. In one preferred embodiment, elongated member 54 is telescoping in nature to allow the adjustment of its length and rotates about its own longitudinal axis. As a result, member 54 and allows holder 10 to accommodate poles 16 of varying length and can be used on uneven surfaces. Base region 56 is substantially T shaped and allows stable resting thereof on any surface. A handle holder 58 extends from base region 56 and is substantially perpendicular to member 54 and has a spiral portion 60, comprised of a series of coils, to accommodate the handle region 32 of pole 16.

Now referring more specifically to FIG. 4, holder 10 is illustrated in its stowed position to allow facile transportability. Base 56 is rotated upwards at attaching region 20 such that member 54 is substantially coplanar with first leg 22. Handle holder 58 is received within top portion 24 of first region 12, such that spiral portion 60 is removably retained within first region 12. First connector 34 can be used as a handle to transport holder 10.

In one preferred embodiment, first region 12 measures 31 inches from top portion 24 to bottom portion 26. First connector 34 is placed 4 inches below top portion 24, and in the two holder configuration extends twelve inches between opposing first legs 22 and in the one holder configuration extends for five inches. Second connector 44 is placed three inches above the end of bottom portion 26 and in the two holder configuration extends twelve inches between opposing first legs 22 and in the one holder configuration extends for six inches. First section 38 and third section 42 extend for three inches each and second section 40 is adapted to be 2¾ inches away from first leg 22.

While the above description contains many specificities, these should not be construed as limitations on the scope of the invention, but rather as an exemplification of one preferred embodiment thereof. Many other variations are possible without departing from the essential spirit of this invention. Accordingly, the scope of the invention should be determined not by the embodiment illustrated, but by the appended claims and their legal equivalents.

What is claimed is:

1. A fishing pole holder assembly, comprising:
   a first region for holding a fishing pole at a plurality of locations along a shaft of the fishing pole;
   a top portion and a bottom portion interconnected by a first leg defining said first region, the top portion being substantially synclined to maintain and support said shaft of said fishing pole;
   a first connector extends from a point proximal to said top portion and is substantially parallel to a second connector that extends from a point proximal to said bottom portion;
   a second region rotatably attached to said first region and having a handle holder to receive a handle region of said fishing pole; and
   a third region having an element thereon to indicate a strike by a fish connected to said first region and said third region further comprising:
      a first section that extends substantially perpendicularly from said first connector;
      a third section that extends substantially perpendicularly from said second connector; and
      a second section that interconnects said first and third sections such that the second section is maintained in substantially parallel relations with said first leg;
   whereby, in a deployed state said first region is substantially vertical and said second region is substantially horizontal.

2. The fishing pole holder assembly of claim 1, wherein said element is movably maintained along said second section.

3. The fishing pole holder assembly of claim 1, wherein a protrusion extends from said element and detachably engages a fishing line from said fishing pole when the line is in a cast state and maintains the element proximal to said first section.

4. The fishing pole holder assembly of claim 3, wherein a strike by a fish on the line disengages the protrusion and the element falls to said third section and causes an audible and visual indication of the strike.

5. The fishing pole holder assembly of claim 1, wherein a spiral portion is defined on said handle holder to securely, yet removably, engage the handle region of the fishing pole.

6. The fishing pole holder assembly of claim 1, said first region further comprising a plurality of first regions interconnected by said first connector and said second connector capable of accommodating a plurality of fishing poles.

7. The fishing pole holder assembly of claim 6, said third region further comprising a plurality of third regions functioning with said plurality of first regions.

8. The fishing pole holder assembly of claim 1, wherein a protrusion extends from said element and detachably engages a fishing line from said fishing pole when the line is in a cast state and maintains the element proximal to said first section.

9. The fishing pole holder assembly of claim 8, wherein a strike by a fish on the line disengages the protrusion and the element falls to said third section and causes an audible and visual indication of the strike.

10. The fishing pole holder assembly of claim 1, wherein an attaching region having a cavity therein rotatably receives said second connector, thereby allowing vertical adjustment of said second region.

11. The fishing pole holder assembly of claim 1, wherein said second region further comprises a member that is elongated and telescopic and maintains said handle holder at an end opposing the rotatable attachment of said second region to said first region.

12. The fishing pole holder assembly of claim 1, wherein said second region is also rotatable along an axis that is perpendicular to an axis of rotation of said first and second region.

13. The fishing pole holder assembly of claim 1, wherein in a stowed position said top portion removably engages said handle holder of said second region.

* * * * *